(12) United States Patent
Caruel et al.

(10) Patent No.: US 11,614,052 B2
(45) Date of Patent: Mar. 28, 2023

(54) ACTIVE TOGGLE LOCK FOR A THRUST REVERSER OF AN AIRCRAFT NACELLE

(71) Applicant: Safran Nacelles, Gonfreville l'Orcher (FR)

(72) Inventors: Pierre Charles Caruel, Moissy Cramayel (FR); Alexandre Francois Paul Louis Descamps, Moissy Cramayel (FR)

(73) Assignee: Safran Nacelles, Gonfreville l'Orcher (FR)

( * ) Notice: Subject to any disclaimer, the term of this patent is extended or adjusted under 35 U.S.C. 154(b) by 340 days.

(21) Appl. No.: 16/790,857

(22) Filed: Feb. 14, 2020

(65) Prior Publication Data
US 2020/0263633 A1 Aug. 20, 2020

(30) Foreign Application Priority Data
Feb. 14, 2019 (FR) ...................................... 1901499

(51) Int. Cl.
*F02K 1/76* (2006.01)
*F02K 1/60* (2006.01)
*E05B 83/00* (2014.01)

(52) U.S. Cl.
CPC .............. *F02K 1/766* (2013.01); *F02K 1/605* (2013.01); *E05B 83/00* (2013.01)

(58) Field of Classification Search
CPC ........... F02K 1/605; F02K 1/766; E05B 83/00
See application file for complete search history.

(56) References Cited

U.S. PATENT DOCUMENTS

| | | | | |
|---|---|---|---|---|
| 5,826,823 | A | 10/1998 | Lymons et al. | |
| 6,021,636 | A * | 2/2000 | Johnson | E05B 81/10 |
| | | | | 244/110 B |
| 6,045,091 | A * | 4/2000 | Baudu | B64D 29/06 |
| | | | | 244/110 D |
| 2014/0131515 | A1* | 5/2014 | Caruel | B64D 33/04 |
| | | | | 244/110 B |
| 2018/0202390 | A1* | 7/2018 | Kopecek | E05C 19/12 |

OTHER PUBLICATIONS

French Preliminary Search Report for French application 1901499, dated Nov. 14, 2019.

* cited by examiner

*Primary Examiner* — Andrew H Nguyen
(74) *Attorney, Agent, or Firm* — Burris Law, PLLC (57) ABSTRACT

An active locking system of a movable element for a thrust reverser of an aircraft nacelle includes an active locking device of the movable element, movable between a locking position and an unlocking position, an actuator of the locking device controlled by a command for actuating the locking device, a blocking device for blocking the locking device in the unlocked position, movable between a blocking position and an unblocking position, and a device for displacing the blocking device. The actuation command controls the closure of the movable element, and the device for displacing the blocking device displaces the blocking device in the unblocking position when the movable element is at a predetermined position.

12 Claims, 11 Drawing Sheets

ACTIVE TOGGLE LOCK FOR A THRUST REVERSER OF AN AIRCRAFT NACELLE

CROSS-REFERENCE TO RELATED APPLICATIONS

This application claims priority to and the benefit of FR 19/01499 filed on Feb. 14, 2019. The disclosure of the above application is incorporated herein by reference.

FIELD

The present disclosure relates to closed position active locking system for a thrust reverser of an aircraft nacelle.

BACKGROUND

The statements in this section merely provide background information related to the present disclosure and may not constitute prior art.

In order to shorten the braking distance of an aircraft equipped with turbojet engines each surrounded by a nacelle ensuring guidance of a gas flow generated by the turbojet engine, it is known to equip the aircraft with a thrust reverser.

A nacelle generally has a structure comprising an air inlet upstream of the engine, a middle section intended to surround a fan or the compressors of the turbojet engine and its casing, a downstream section which can accommodate thrust reversal means and intended to surround the combustion chamber of the turboshaft engine, and is generally terminated by an ejection nozzle whose outlet is located downstream of the turbojet engine.

Furthermore, a nacelle usually comprises an outer structure comprising the air inlet, the middle section and the downstream section, and an Inner Fixed Structure (IFS), concentric with the downstream section, surrounding the core of the turbojet engine behind the fan. These outer and inner structures define an annular flow channel, also called a secondary flow path, aimed at channeling a cold air flow, called secondary air flow, which circulates outside the turbojet engine.

The thrust reverser comprises thrust reverser movable elements, generally two thrust reverser movable elements, carried by the nacelle to be displaced between a closed position (direct jet) in which the thrust reverser is inactive, and an open position (reverse jet) in which the thrust reverser is active, that is to say it returns at least one portion of the gas flow generated by the turbojet engine in the direction opposite to the flow guided by the nacelle.

In the reverse jet position, the thrust reverser returns at least one portion of the gas flow generated by the turbojet engine in the direction opposite to the flow guided by the nacelle.

In one thrust reverser type, the thrust reverser movable elements consist of doors.

It is known to provide a locking system ensuring the locking of the doors in the direct jet position, in order to eliminate any risk of inadvertent opening of the doors.

Usually, the locking systems include locks in the form of hooks, and springs, the springs exerting a force against the hooks in order to set them into the locking position.

The hooks are therefore in the locked position when the doors are in the reverse jet position.

When the doors pass into the direct jet position, the springs enable the hooks to let the doors pass in order to lock them.

SUMMARY

This section provides a general summary of the disclosure and is not a comprehensive disclosure of its full scope or all of its features.

The present disclosure provides an active locking system arranged to assist the closure of the doors by applying, at the end of travel, a closing effort on the doors, and to enable the locking of the doors in the direct jet position by dispensing with door position sensors to trigger the application of this effort.

To this end, the present disclosure proposes an active locking system of a movable element for a thrust reverser of an aircraft nacelle, the thrust reverser being of the type including a fixed structure and at least one movable element, said movable element being mounted pivoting or translating between a direct jet position, in which it provides the aerodynamic continuity of the nacelle, and a reverse jet position in which it opens at least one passage in the nacelle, the locking system including:

an active locking device of the movable element, movable between a locking position and an unlocking position, an actuator of the locking device controlled by a command for actuating the locking device, a blocking device for blocking the locking device in the unlocked position, movable between a blocking position and an unblocking position, a device for displacing the blocking device, characterized in that the command for actuating the locking device is intended to control operation of the movable element towards the direct jet position, in other words, to control the closure of the movable element, and in that the device for displacing the blocking device is intended to displace the blocking device into the unblocking position when the movable element is at a predetermined position.

In the following description, the term "locking device" means "active locking device."

The command for actuating the locking device is configured to control both a displacement of the actuator of the active locking device and a displacement of the movable element. More particularly, the command for actuating the locking device is configured to control both the closure of the movable element and the locking of the locking device.

The blocking device for blocking the active locking device is configured to block the locking device in the unlocked position when the command for actuating the locking device controls the closure of the movable element and the locking of the locking device.

The device for displacing the blocking device of the locking device is configured to displace the blocking device into the unblocking position when the movable element is at a predetermined position.

The device for displacing the blocking device of the locking device is configured to be mechanically linked to the movable element.

Thus, the unblocking of the locking device in the locking position is passively controlled by the position of the movable element.

Thus, the locking device can lock the movable element only when the movable element is at a predetermined position, although the locking has been actuated during the control of the closure of the movable element.

Furthermore, the active locking system allows assisting in closing excessively flexible movable elements, or movable elements including a closing actuator that is too weak or disposed too far from said locking system.

According to one feature, the locking device includes at least one hook.

According to one feature, the actuator of the locking device is a cylinder.

According to one feature, the command for actuating the locking device is a hydraulic and/or electrical command.

According to one feature, the blocking device includes at least one element secured to the locking device.

According to one feature, the blocking device includes two hinged arms, a first arm being fixedly connected to the locking device and a second arm being intended to be fixedly connected to the fixed structure.

According to one feature, a fixed stop is intended to be disposed on the fixed structure, so as to limit the movement of the arm connected to the fixed structure beyond a specific angle to provide the blocking function.

According to one feature, the blocking device is passive. Thus, the unblocking is passively controlled by the position of the movable element.

According to one feature, the device for displacing the blocking device is a sliding member intended to be connected to the movable element, designed so as to slide during the operation/closure of the movable element, in the direction of the blocking device so as to displace it into the unblocking position when the movable member is in a predetermined position.

The actuator of the unblocking device is therefore passive. The unblocking is passively controlled by the position of the movable element.

According to this feature, a blocking spring is intended to exert a force against the blocking device in the direction opposite to the displacement of the device for displacing the blocking device during the operation/closure of the movable element, said spring being designed so as to be compressed by the blocking device during the displacement of the displacement device during the closure of the movable element.

Thus, the blocking device is in the blocking position when the movable element is in the reverse jet position, the device for displacing the blocking device being then away from the blocking device.

The actuator of the locking device is designed to actuate the locking when the blocking device is in the unblocking position.

The movable element may be a pivoting door or a translating cowl.

The present disclosure also concerns a system for closing a pair of doors for a thrust reverser of an aircraft nacelle, the doors being diametrically opposed and pivotally mounted between a direct jet position, in which they provide the aerodynamic continuity of the nacelle, and a reverse jet position in which they open at least one passage in the nacelle, the system comprising:

an actuator for closing the doors including two first connecting rods, each first connecting rod being connected to a first lateral edge of each door, said actuator being arranged to operate each door at least towards the direct jet position, two sliding members each carrying a second connecting rod connected to the lateral edge opposite to the first lateral edge of each door, said connecting rods being arranged to be driven by the doors when the closing actuator operates the doors towards the direct jet position, so as to displace the sliding members, and a system for locking the doors as previously described.

According to this feature, the sliding members are the devices for displacing the blocking device of the locking system.

According to one feature, the closing system of a pair of doors includes a device for detecting a breakage of a connecting rod.

Thus, the closing system of a pair of doors allows detecting breakages of door thrust reverser connecting rods after an operating cycle, that is to say after a cycle for opening and closing the doors.

The doors may be identical or different.

According to other features of the present disclosure, the closing system of a pair of doors includes one or more of the following optional features considered alone or according to all possible combinations:

the closing actuator is arranged so as to operate the doors towards the direct jet position and towards the reverse jet position, this is referred to as a double-acting cylinder;

the closing actuator is arranged to operate the doors towards the direct jet position, this is referred to as a single-acting cylinder;

the closing actuator is arranged so as to operate the doors towards the direct jet position, and the closing system includes an opening actuator arranged so as to operate the doors towards the reverse jet position, this is referred to as single-acting cylinders for the closing actuator and the opening actuator;

an electrical and/or hydraulic command for actuating the closing actuator allows controlling the closure of the doors; and/or the command for actuating the closing actuator is advantageously identical to the command for actuating the locking device.

The present disclosure further concerns a thrust reverser of an aircraft nacelle, the thrust reverser being of the type including at least one movable element mounted pivoting or translating between a direct jet position, in which it provides the aerodynamic continuity of the nacelle, and a reverse jet position, in which it opens at least one passage in the nacelle, characterized in that the thrust reverser comprises at least one active locking system as previously described.

According to one feature, the thrust reverser comprises at least one movable element in the form of a translating cowl, and the active locking system comprises:

an active locking device of the translating cowl, movable between a locking position and an unlocking position;

an actuator of the locking device controlled by a locking command;

a blocking device for blocking the locking device in the unlocked position, movable between a blocking position and an unblocking position; and a device for displacing the blocking device.

Alternatively, the thrust reverser comprises two movable elements in the form of diametrically opposed pivoting doors, and the active locking system comprises:

an active locking device of each pivoting door, movable between a locking position and an unlocking position;

an actuator of the locking device controlled by a locking command;

a blocking device for blocking each locking device in the unlocked position, movable between a blocking position and an unblocking position; and a device for displacing each blocking device.

According to this variant, the thrust reverser comprises a system for closing the pivoting doors comprising:

an actuator for closing the doors including two first connecting rods, each first connecting rod being connected to a first lateral edge of each door, said actuator being arranged to operate each door at least towards the direct jet position; and two sliding members, each of the two sliding members carrying a second connecting rod connected to the lateral edge opposite to the first lateral edge of each door, said connecting rods being arranged so as to be driven by the doors when the closing actuator operates the doors towards the direct jet position, so as to displace the sliding members, and said sliding members forming the devices for displacing each blocking device.

According to this feature, the closing system includes a device for detecting a breakage of a connecting rod.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
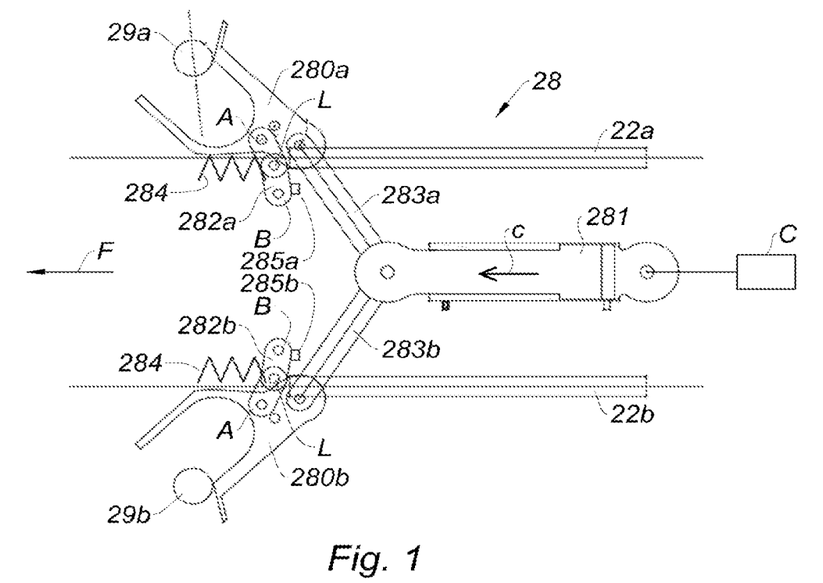
FIG. 1 is a schematic view of an active locking system according to the present disclosure, in the blocked unlocking position of doors in the open position.

FIG. 1 represents an active locking system 28 in the blocked unlocking position of doors in the open position (FIG. 8), including:

two respectively upper 280a and lower 280b locking devices in the form of hooks;

an actuator 281 of the locking device 280a, 280b, in the form of a cylinder;

two respectively upper 282a and lower 282b blocking devices for blocking the locking devices 280a, 280b, in the form of shackles; and two respectively upper 22a and lower 22b devices for displacing respectively the upper 282a and lower 282b blocking devices in the form of sliding members.

The hooks 280a, 280b, are arranged so as to let pass respectively upper 29a and lower 29b rollers, secured to respectively upper 12a and lower 12b doors, (FIGS. 7 and 8), so as to enable opening and closing said door.

They are in the unlocking position.

The hooks 280a, 280b are pivotally mounted between this unlocking position and a locking position (FIG. 6) in which they trap the rollers 29a, 29b, in order to lock the doors in the closed position.

The actuator 281 of the hooks 280a, 280b, is connected to said hooks 280a, 280b, by respectively upper 283a and lower 283b tie rods.

The actuator 281 of the hooks 280a, 280b, is controlled by a locking command C arranged to control both the locking of the hooks 280a, 280b, and the closure of the doors during operation.

Thus, when the closure of the doors is controlled, the locking of the hooks is simultaneously controlled by displacing the actuator 281 of the hooks 280a, 280b according to the arrow C.

The shackles 282a, 282b, are arranged to block the rotation of the hooks 280a, 280b towards the locking position, despite the locking command.

They are in the blocking position.

They comprise a first arm A and a second arm B, connected to each other by a ball joint L.

The first and second arms A, B are hinged to each other.

Figure 7:
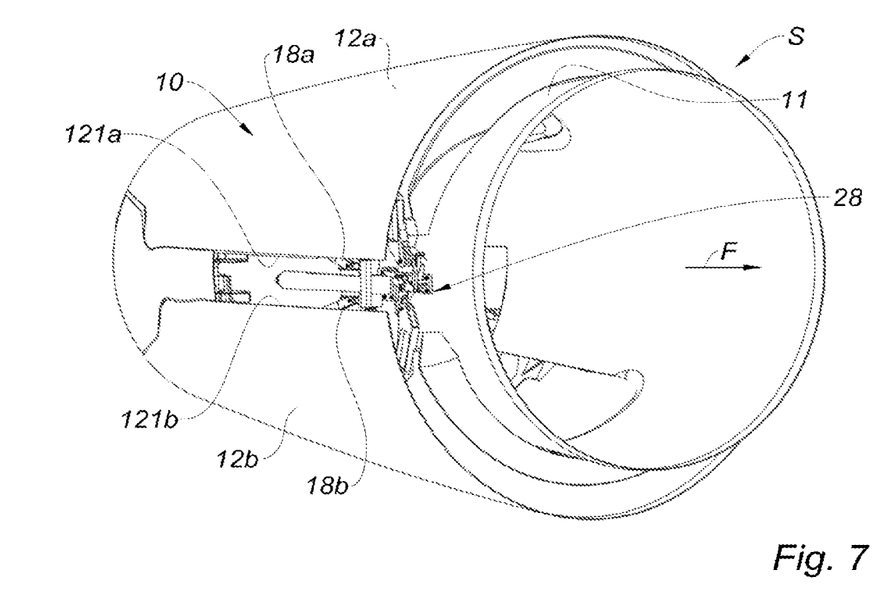
FIG. 7 is a schematic perspective view of a portion of a downstream section of a nacelle including a door thrust reverser whose doors are in the direct jet position, showing an active locking system according to the present disclosure.
Figure 8:
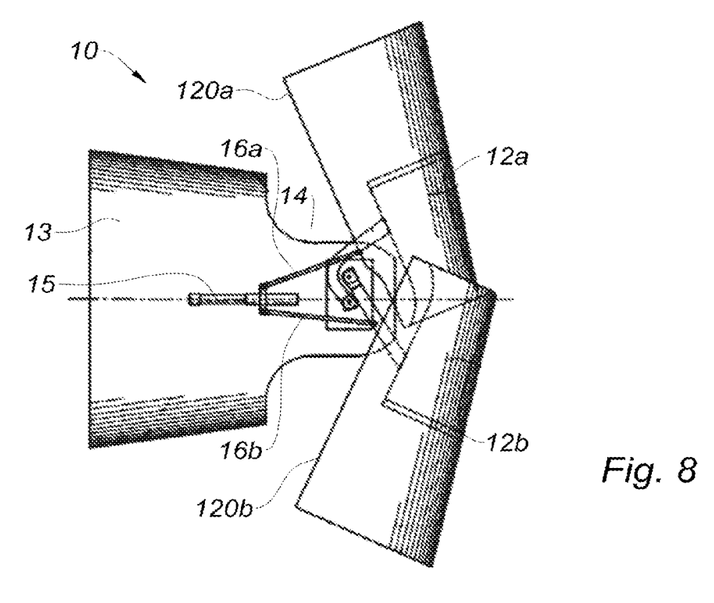
FIG. 8 is a schematic side view of the door thrust reverser of FIG. 1, showing an actuator for closing the doors, the doors being in the reverse jet position.

The first arm A is fastened to the hook 280a, 280b, whereas the second arm B is fastened to the inner fixed structure 11 (FIGS. 7 and 8).

A respectively upper 285a and lower 285b fixed stop, is disposed on the inner fixed structure 11 (FIGS. 7 and 8), so as to limit the movement of the second arm B beyond a specific angle to provide the blocking function.

Figure 6:
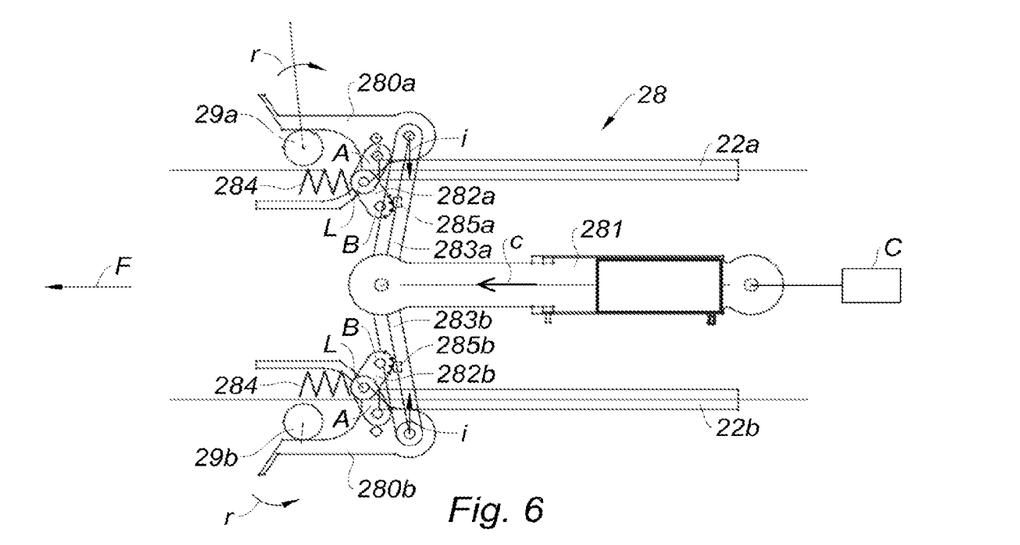
FIG. 6 is a schematic view of the active locking system according to the present disclosure, in the blocked locking position of doors in the closed position.

The shackles 282a, 282b are movably mounted between this blocking position and an unblocking position (FIG. 2) in which they enable the rotation of the hooks 280a, 280b towards the locking position (FIG. 6).

The displacement devices 22a, 22b of the shackles 282a, 282b are adapted to slide so as to unblock the shackles, when the doors are in a substantially closed position.

They are disposed downstream of the shackles 282a, 282b.

The downstream is the direction opposite to the upstream, the upstream being represented by the arrow F.

They are connected to the respectively upper 12a and lower 12b doors (FIG. 7), so as to slide in the direction of the shackles 282a, 282b, that is to say in the upstream direction, during the closure of the doors until reaching the ball joints L or the second arm B of the shackles 282a, 282b.

Thus, when the doors are in a substantially closed position (FIG. 7), the shackles 282a, 282b are unblocked and the hooks can pivot into the locking position.

A blocking spring 284 disposed upstream of the shackles 282a, 282b, allows exerting a force against the shackles 282a, 282b, at the level of their ball joint L, in the direction opposite to the displacement of the sliding member 22a, 22b during the closure of the door, that is to say in the downstream direction.

Thus, the blocking spring 284 allows positioning the shackles 282a, 282b in the blocking position.

In this blocking position, only a sliding of the sliding member 22a, 22b, in the upstream direction is designed to displace the shackle 282a, 282b in its unblocking position, by compressing the blocking spring 284.

Figure 2:
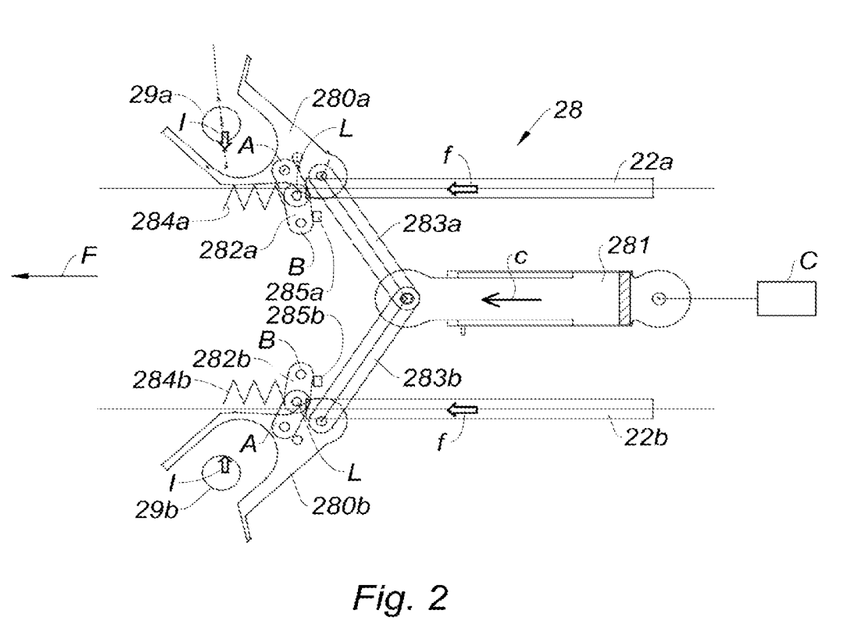
FIG. 2 is a schematic view of the active locking system according to the present disclosure, in the unblocked unlocking position of doors being closed.

FIG. 2 represents the active locking system 28 in the unblocked unlocking position of doors being closed.

During the closure of the doors, the sliding members 22a, 22b slide according to the arrows "F," in the upstream direction.

When they come into contact with the ball joint L of the shackles 282a, 282b, they displace the shackles 282a, 282b, in their unblocking position.

When they come into contact with this ball joint L, the rollers 29a, 29b secured to the doors are disposed inside the hooks 280a, 280b.

Figure 3:
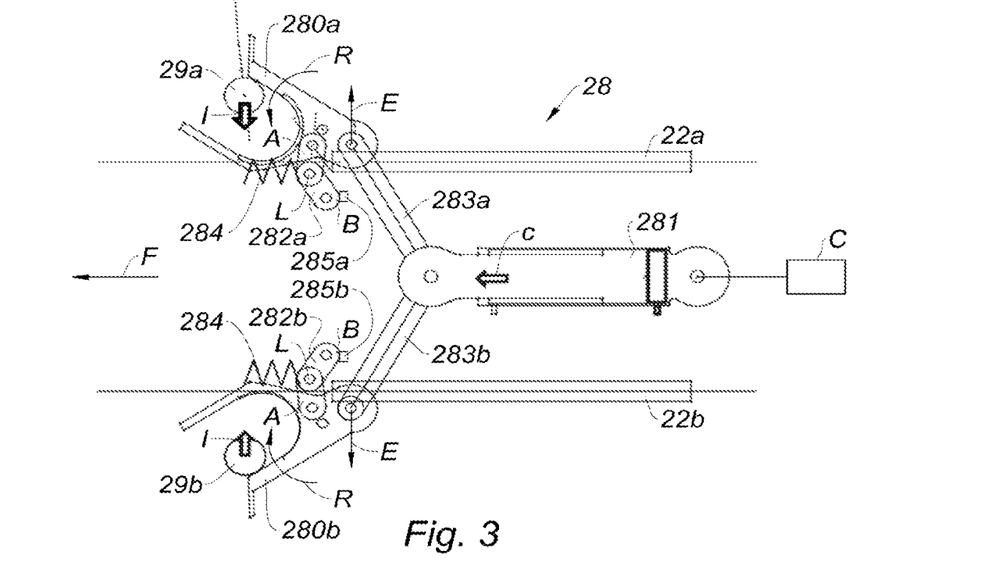
FIG. 3 is a schematic view of the active locking system according to the present disclosure, in the active locking position of doors being closed.

In this unblocking position, the actuator 281 of the locking devices 280a, 280b is designed to make the hooks 280a, 280b pivot, via the tie rods 283a, 283b (FIG. 3).

The blocking spring 284 is then compressed by the shackles 282a, 282b displaced by the sliding members 22a, 22b.

FIG. 3 represents the active locking system 28 in the active locking position of doors being closed.

The actuator 281 of the locking devices 280a, 280b displaces the end of the tie rods 283a, 283b that are attached thereto, upstream.

Thus, the end of the tie rods 283a, 283b attached to the hooks is displaced outwardly, according to the arrows E.

This displacement of the tie rods 283a, 283b, causes a rotation of the hooks 280a, 280b in a first direction indicated by the arrows R.

The hooks 280a, 280b then come into contact with the rollers 29a, 29b secured to the doors and displace them inwardly, according to the arrows I, which drives the doors into the closed position.

The active locking system 28 is therefore in the active locking position.

It allows assisting the closure of the doors.

The shackles 282a, 282b are also displaced by following the movement of the hooks 280a, 280b and compress the blocking springs 284.

Figure 4:
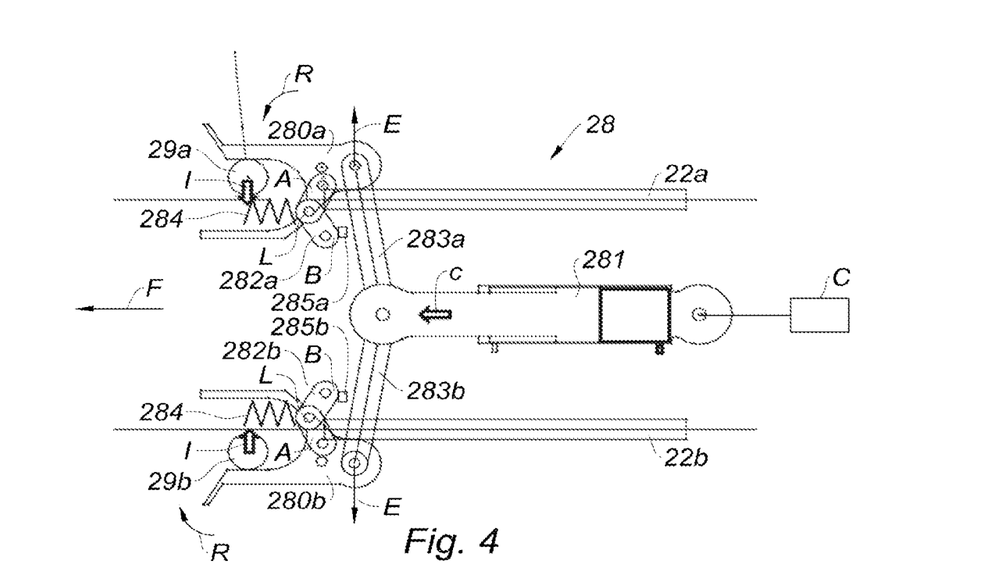
FIG. 4 is a schematic view of the active locking system according to the present disclosure, in the unblocked locking position of doors in the closed position.

FIG. 4 represents the active locking system 28 in the unblocked locking position of doors in the closed position.

The actuator 281 of the locking devices 280a, 280b further displaces the end of the tie rods 283a, 283b attached to the hooks, outwardly, according to the arrows E.

This displacement of the tie rods 283a, 283b, causes a rotation of the hooks 280a, 280b in a first direction indicated by the arrows R, which allows displacing the rollers 29a, 29b inwardly according to the arrows I. The doors are then in the closed position.

In this position, the tie rods 283a, 283b enable the rotation of the hooks 280a, 280b towards the unlocking position (FIGS. 1 and 2).

The active locking system 28 is therefore in the unblocked locking position.

Figure 5:
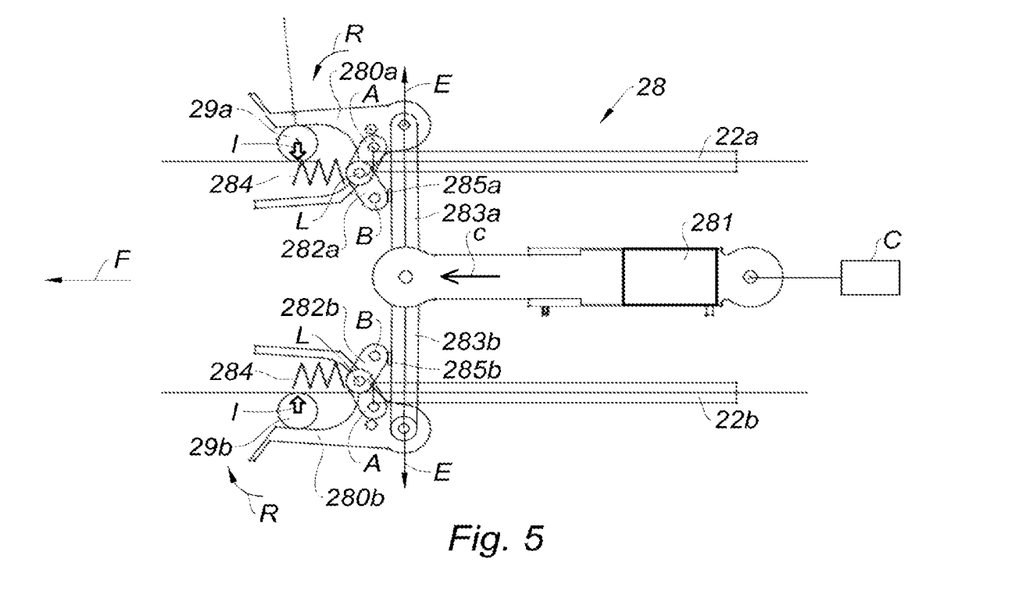
FIG. 5 is a schematic view of the active locking system according to the present disclosure, in the unblocked locking position of doors in the over-retracted position.

FIG. 5 represents the active locking system 28 in the unblocked locking position of doors in the over-retracted position.

The actuator 281 of the locking devices 280a, 280b further displaces the end of the tie rods 283a, 283b attached to the hooks, outwardly, according to the arrows E.

This displacement of the tie rods 283a, 283b, causes a rotation of the hooks 280a, 280b in the first direction indicated by the arrows R, which allows displacing the rollers 29a, 29b inwardly according to the arrows I. The doors are then in the over-retracted position.

The term "over-retracted position" means that the doors are closed beyond their normal rest position.

In this position, the tie rods 283a, 283b enable the rotation of the hooks 280a, 280b towards the unlocking position (FIGS. 1 and 2).

The active locking system 28 is therefore in the unblocked locking position.

FIG. 6 represents the active locking system 28 in the blocked locking position of doors in the closed position.

The actuator 281 of the locking devices 280a, 280b displaces the end of the tie rods 283a, 283b that are attached thereto, upstream.

Thus, the end of the tie rods 283a, 283b attached to the hooks is displaced inwardly, according to the arrows "I."

This displacement of the tie rods 283a, 283b, causes a rotation of the hooks 280a, 280b in the direction opposite to the first direction, indicated by the arrows "R."

The doors are then in the closed position.

The shackles 282a, 282b are also displaced by following the movement of the hooks 280a, 280b.

In this position, the tie rods 283a, 283b do not allow the hooks 280a, 280b to rotate towards the unlocking position (FIGS. 1 and 2).

The tie rods 283a, 283b are in the blocking position of the hooks 280a, 280b.

The active locking system 28 is therefore in the blocked locking position.

FIGS. 7 and 8 represent a portion of a downstream section S of a nacelle, comprising a thrust reverser 10 including an active locking system 28 (FIG. 7) as previously described and a system (FIG. 8) for closing the respectively upper 12a and lower 12b doors.

The doors 12a, 12b of the thrust reverser of FIG. 7 are in the direct jet closed position, whereas the doors 12a, 12b of the thrust reverser of FIG. 8 are in the reverse jet open position.

The downstream section S includes an inner fixed structure 11 and a movable outer structure comprising two respectively upper 12a and lower 12b doors.

The upstream of the downstream section S is defined by the arrow F.

The upper 12a and lower 12b doors are in the direct jet position. They are pivotally mounted between this direct jet position, in which they provide the aerodynamic continuity of the nacelle, and a reverse jet position (FIG. 8) in which they open at least one passage 14 (FIG. 8) in the nacelle.

The direct jet position corresponds to the closed position (closed doors) whereas the reverse jet position corresponds to the open position (open doors).

As illustrated in FIG. 8, the thrust reverser 10 includes a double-acting cylinder 15 of a system for closing the doors, disposed on the inner fixed structure 11 at the level of a first lateral edge 120a, 120b of the doors 12a, 12b. It is arranged to operate the doors 12a, 12b from the direct jet position (FIG. 7) towards the reverse jet position (FIG. 8) and from the reverse jet position (FIG. 8) towards the direct jet position (FIG. 7).

The double-acting cylinder 15 is an operating actuator allowing actuating both the closure and the opening of the doors 12a, 12b.

The active locking system 28 (FIG. 7) is arranged on the inner fixed structure 11, on the side opposite to the double-acting cylinder 15 (FIG. 8), at the level of a lateral edge 121a, 121b opposite to the first lateral edge 120a, 120b, of the doors 12a, 12b.

The double-acting cylinder 15 (FIG. 8) is connected to each door 12a, 12b by first respectively upper 16a and lower 16b connecting rods, whereas the active locking system 28 (FIG. 7) is connected to each door 12a, 12b by second respectively upper 18a and lower 18b connecting rods, via the respectively upper 22a and lower 22b displacement devices.

Each first respectively upper 16a and lower 16b connecting rod is connected to the first respectively upper 120a and lower 120b lateral edge, of each respectively upper 12a and lower 12b door.

Each second respectively upper 18a and lower 18b connecting rod is connected to the lateral edge 121a, 121b opposite to the first lateral edge 120a, 120b, of the doors 12a, 12b.

In one form, the double-acting cylinder 15 is replaced by a closing single-acting cylinder, arranged so as to operate the doors 12a, 12b towards the direct jet position. This closing single-acting cylinder is a closing actuator. The opening of the doors is achieved by the effect of the pressure.

In a variant of this form, an opening single-acting cylinder (not represented) is arranged on the inner fixed structure 11 on the side opposite to the closing single-acting cylinder, to operate the doors 12a, 12b towards the reverse jet position. This opening single-acting cylinder is an opening actuator.

Figure 9:
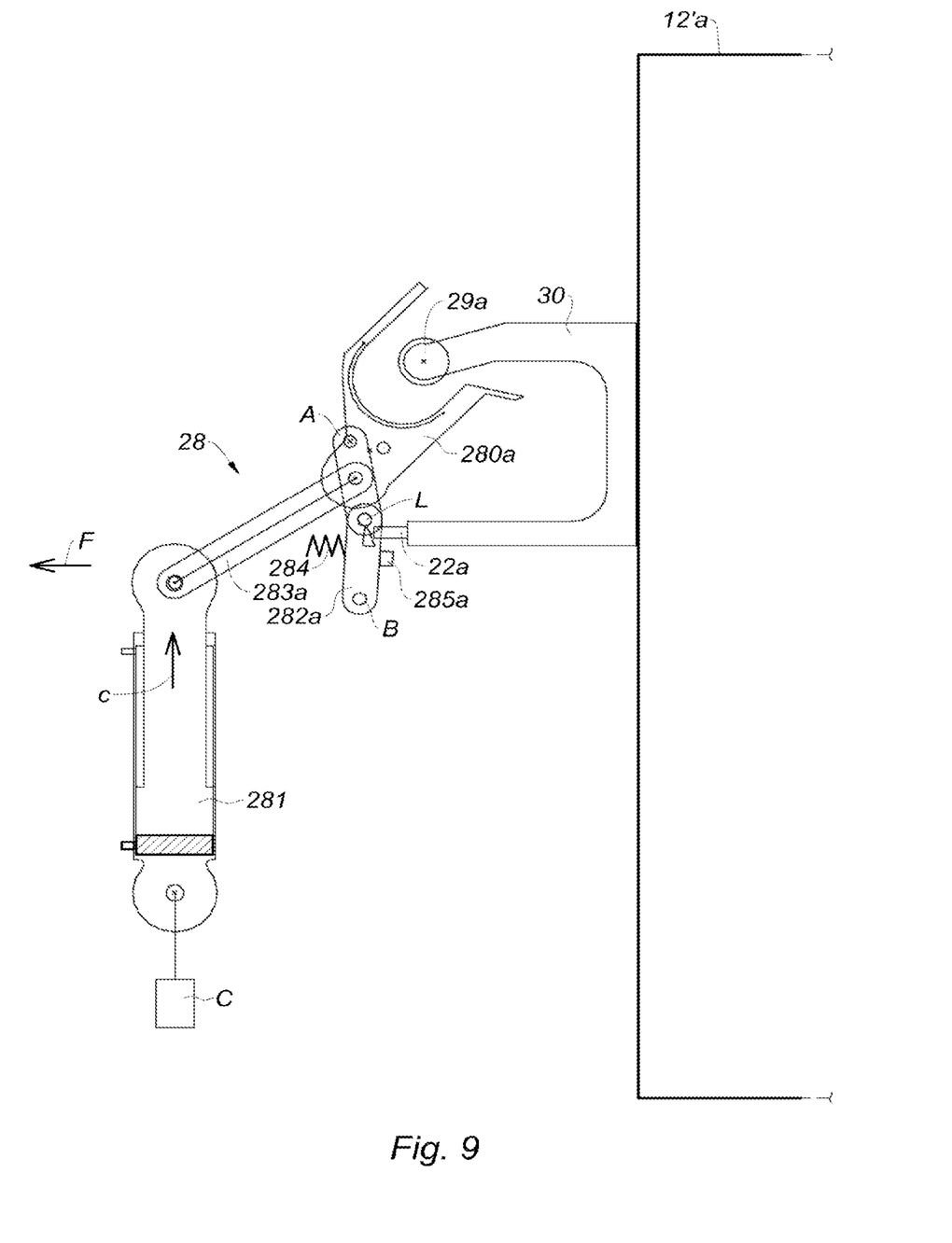
FIG. 9 is a schematic view of an active locking system according to the present disclosure, in the blocked unlocking position of a translating cowl in the open position.

FIG. 9 represents an active locking system 28 in the blocked unlocking position of a translating cowl 12'a in the open position, including:

a locking device 280a, in the form of a hook;
an actuator 281 of the locking device 280a, in the form of a cylinder;
a blocking device 282a for blocking the locking device 280a in the form of a shackle; and
a device 22a for displacing the blocking device 282a in the form of a sliding member.

The hook 280a is arranged so as to let pass a roller 29a, secured to the translating cowl 12'a via a roller support 30, so as to enable the opening and the closure of said cowl.

It is in the unlocking position.

The hook 280a is pivotally mounted between this unlocking position and a locking position (FIG. 14) in which it traps the roller 29a in order to lock the translating cowl 12'a in the closed position.

The actuator 281 of the hook 280a is connected to said hook 280a by a tie rod 283a.

The actuator 281 of the hook 280a, is controlled by a locking command C arranged to control both the locking of the hook 280a and the closure of the translating cowl 12'a.

Thus, when the closure of the translating cowl 12'a is controlled, the locking of the hook is simultaneously controlled by the displacement of the actuator 281 of the hook 280a according to the arrow C.

The shackle 282a is arranged so as to block the rotation of the hook 280a towards the locking position, despite the locking command.

It is in the blocking position.

It comprises a first arm A and a second arm B, connected to each other by a ball joint L.

The first and second arms A, B are hinged to each other.

The first arm A is fastened to the hook 280a, whereas the second arm B is fastened to the inner fixed structure 11 (FIGS. 7 and 8).

A fixed stop 285a is disposed on the inner fixed structure 11, so as to limit the movement of the second arm B beyond a specific angle to provide the blocking function.

Figure 14:
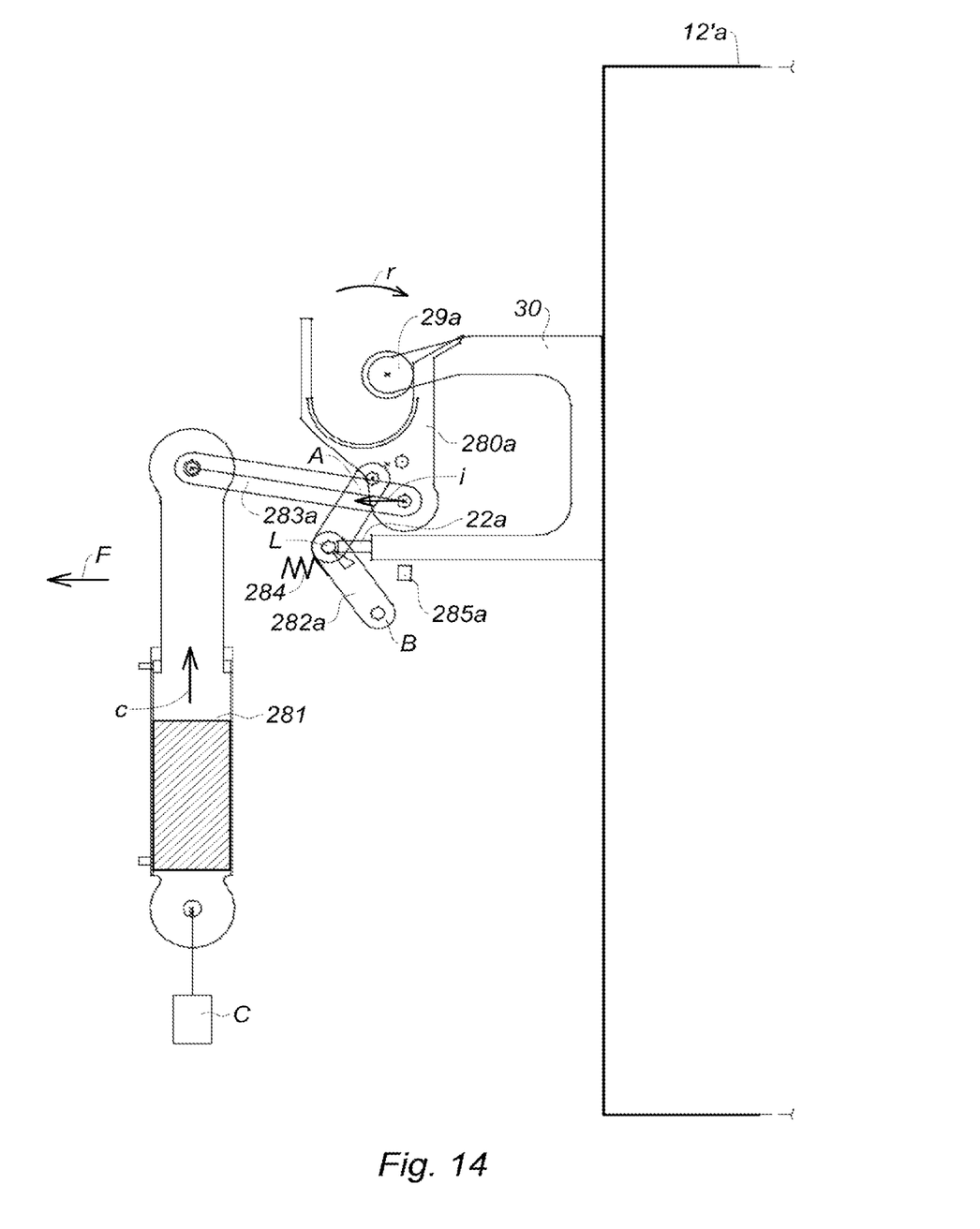
FIG. 14 is a schematic view of the active locking system according to the present disclosure, in the blocked locking position of a translating cowl in the closed position.

The shackle 282a is movably mounted between this blocking position and an unblocking position (FIG. 10) in which it enables the rotation of the hook 280a towards the locking position (FIG. 14).

The device 22a for displacing the shackle 282a is designed so as to slide so as to unblock the shackle, when the translating cowl is in a substantially closed position.

The displacement device 22a is disposed downstream of the shackle 282a.

The downstream is the direction opposite to the upstream, the upstream being represented by the arrow F.

The displacement device 22a is connected to the translating cowl 12'a, so as to slide in the direction of the shackle 282a, that is to say in the upstream direction, during the closure of the translating cowl 12'a until reaching the ball joint L or the second arm B of the shackle 282a.

Thus, when the translating cowl is in a substantially closed position, the shackle 282a is unblocked and the hook can pivot into the locking position.

A blocking spring 284 disposed upstream of the shackle 282a, allows exerting a force against the shackle 282a, at the level of the its ball joint L, in the direction opposite to the displacement of the sliding member 22a during the closure of the translating cowl, that is to say in the downstream direction.

Thus, the blocking spring 284 allows positioning the shackle 282a in the blocking position.

In this blocking position, only a sliding of the sliding member 22a, in the upstream direction is designed to displace the shackle 282a into its unblocking position, by compressing the blocking spring 284.

Figure 10:
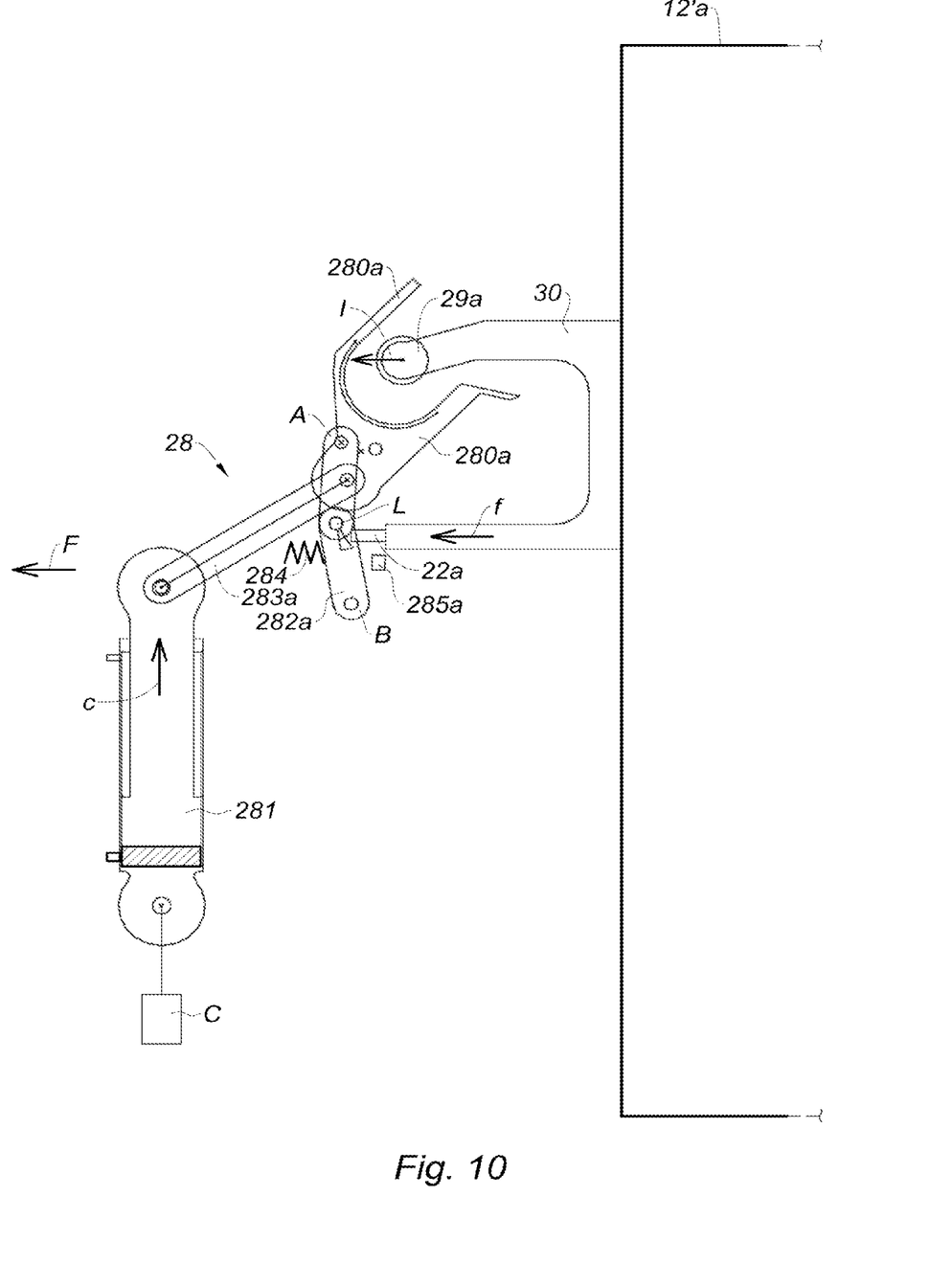
FIG. 10 is a schematic view of the active locking system according to the present disclosure, in the unblocked unlocking position of a translating cowl being closed.

FIG. 10 represents the active locking system 28 in the unblocked unlocking position of the translating cowl being closed.

During the closure of the translating cowl 12'a, the sliding member 22a slides according to the arrows "F," in the upstream direction.

When the sliding member 22a comes into contact with the ball joint L of the shackle 282a, it displaces the shackle 282a into its unblocking position.

When the sliding member 22a comes into contact with this ball joint L, the roller 29a, secured to the translating cowl 12'a, is disposed inside the hook 280a.

Figure 11:
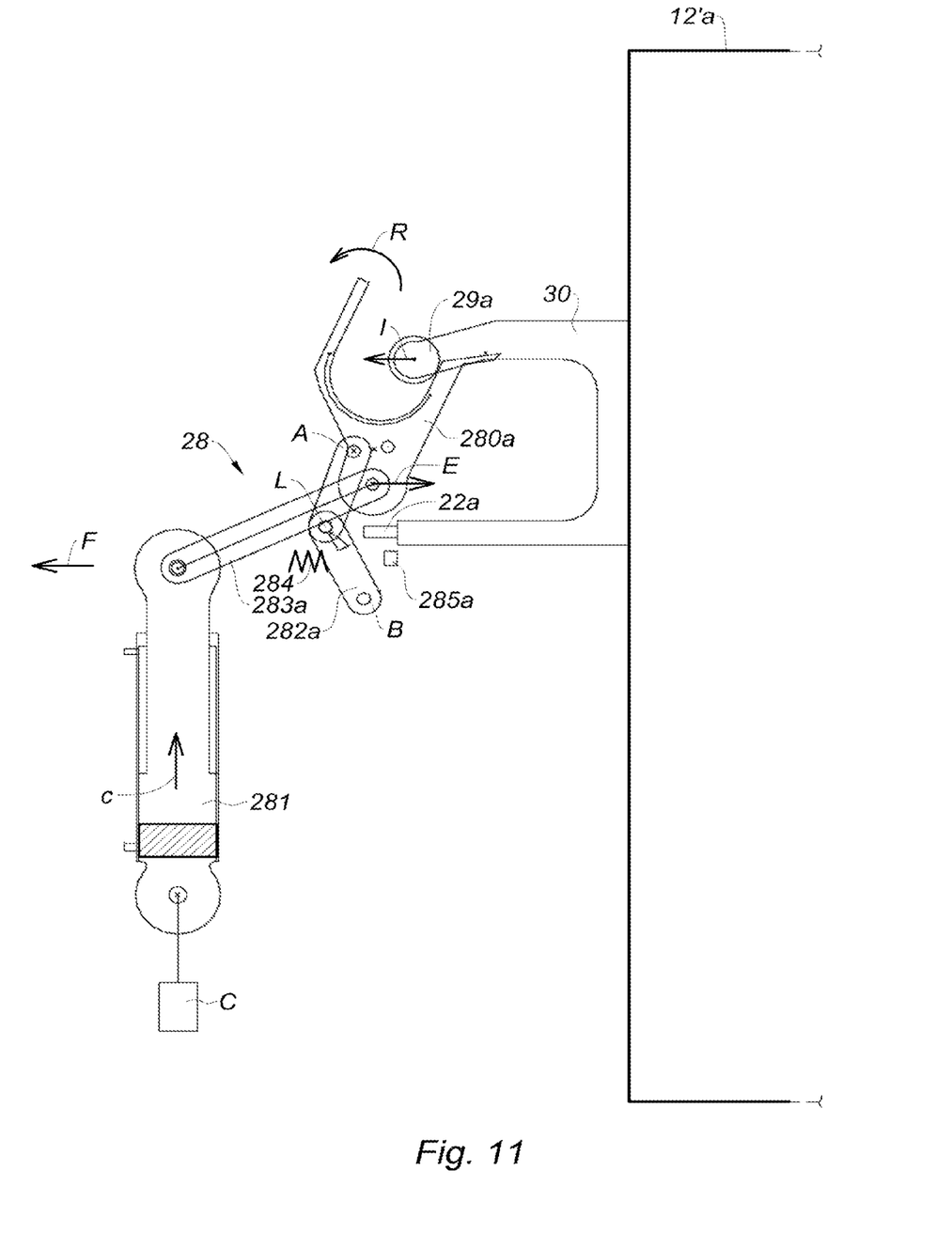
FIG. 11 is a schematic view of the active locking system according to the present disclosure, in the active locking position of a translating cowl being closed.

In this unblocking position, the actuator 281 of the locking device 280a is designed so as to make the hook 280a pivot, via the tie rod 283a (FIG. 11).

The blocking spring 284 is then compressed by the shackle 282a displaced by the sliding member 22a.

FIG. 11 represents the active locking system 28 in the active locking position of the translating cowl being closed.

The actuator 281 of the locking device 280a displaces the end of the tie rod 283a that is attached thereto, upstream.

Thus, the end of the tie rod 283a attached to the hook is displaced outwardly, according to the arrows E.

This displacement of the tie rod 283a, causes a rotation of the hook 280a in a first direction indicated by the arrow R.

The hook 280a then comes into contact with the roller 29a secured to the translating cowl and displaces it inwardly, according to the arrows I, which drives the translating cowl into the closed position.

The active locking system 28 is therefore in the active locking position.

It allows assisting the closure of the translating cowl.

The shackle 282a is also displaced following the movement of the hook 280a and compresses the blocking spring 284.

Figure 12:
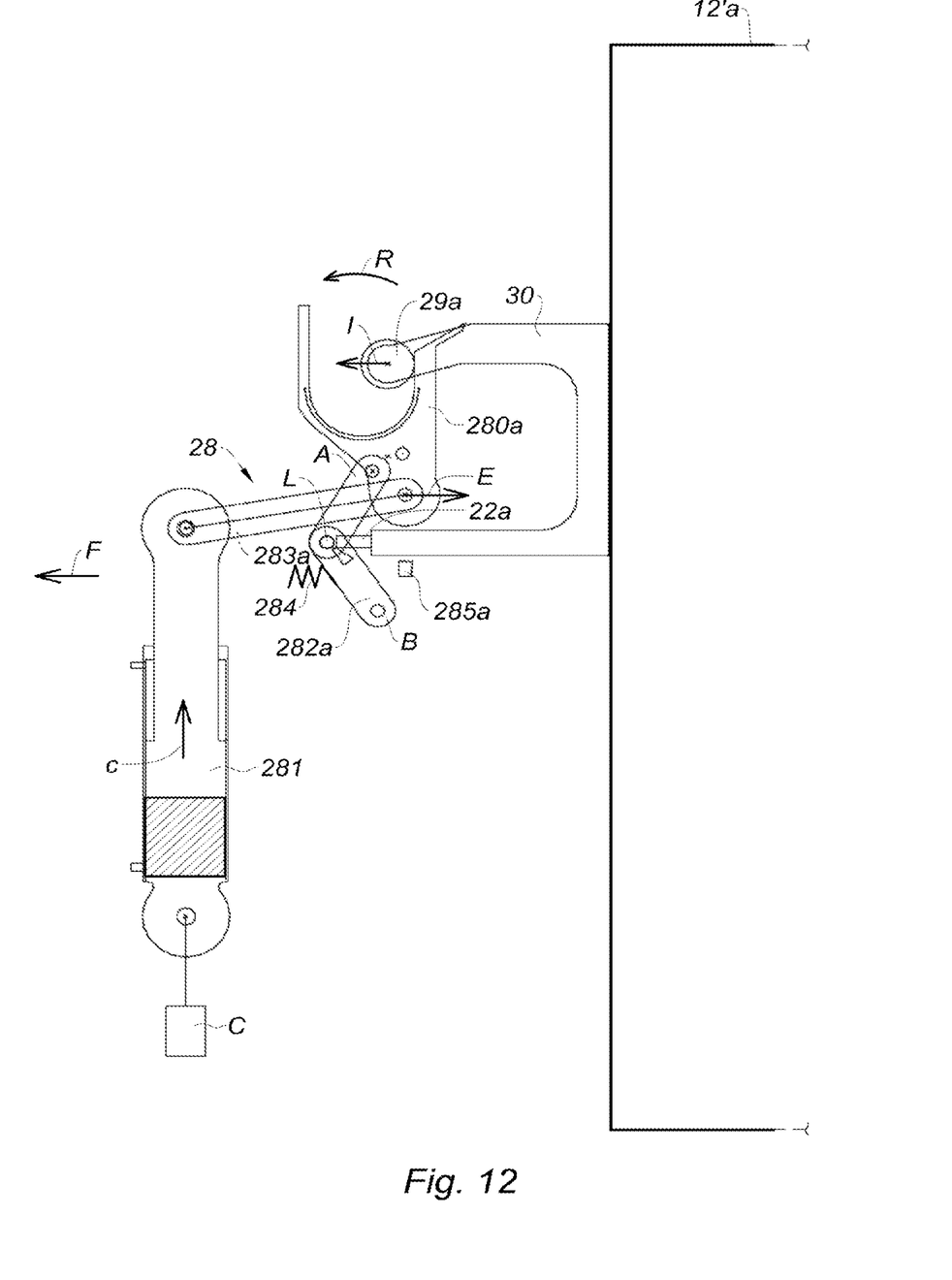
FIG. 12 is a schematic view of the active locking system according to the present disclosure, in the unblocked locking position of a translating cowl in the closed position.

FIG. 12 represents the active locking system 28 in the unblocked locking position of the translating cowl in the closed position.

The actuator 281 of the locking device 280a further displaces the end of the tie rod 283a attached to the hook, outwardly, according to the arrow E.

This displacement of the tie rod 283a, causes a rotation of the hook 280a in a first direction indicated by the arrow R, which allows displacing the roller 29a inwardly according to the arrow I. The translating cowl is then in the closed position.

In this position, the tie rod 283a enables the rotation of the hook 280a towards the unlocking position (FIGS. 9 and 10).

The active locking system 28 is therefore in the unblocked locking position.

Figure 13:
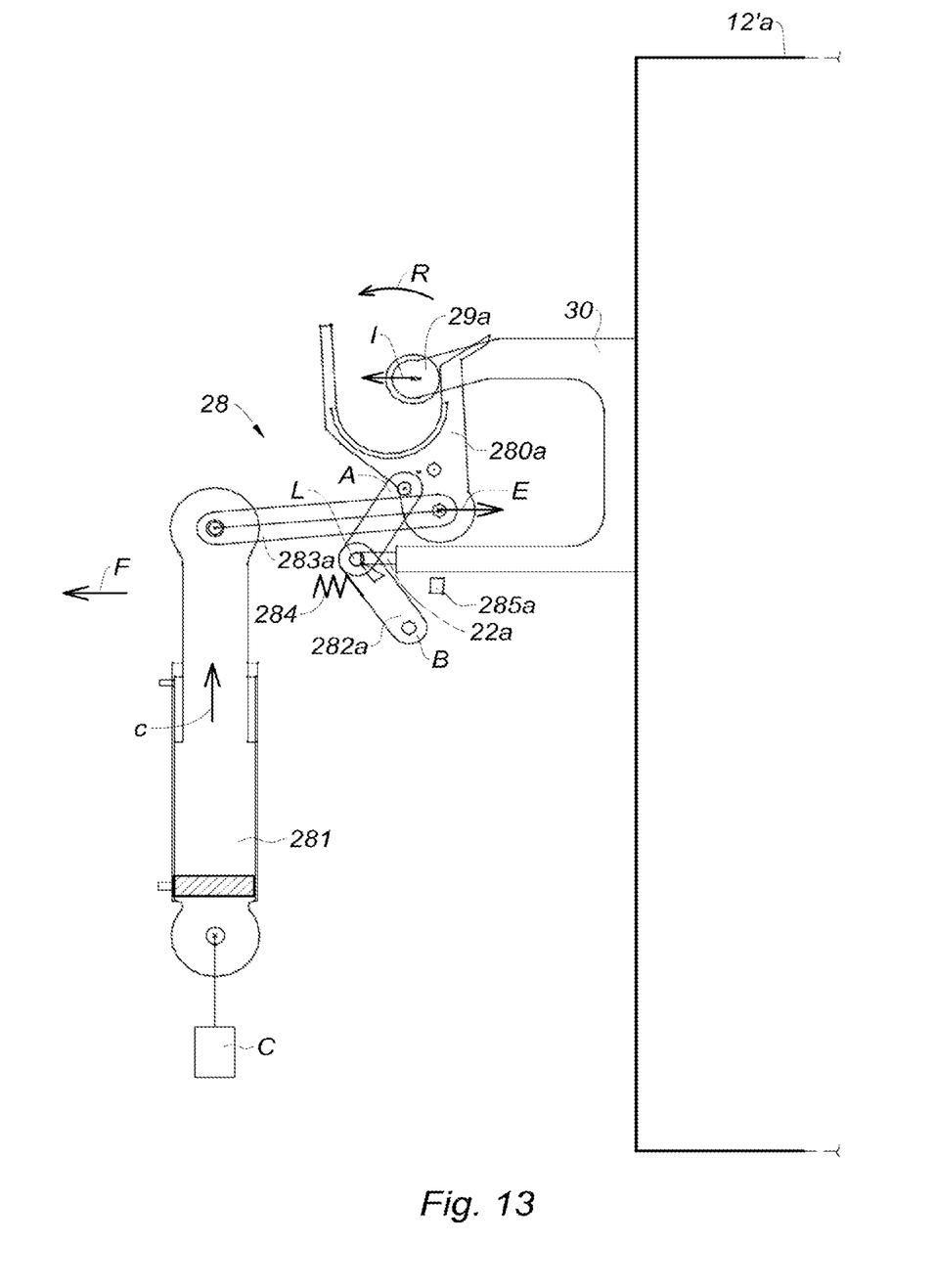
FIG. 13 is a schematic view of the active locking system according to the present disclosure, in the unblocked locking position of a translating cowl in the over-retracted position.

FIG. 13 represents the active locking system 28 in the unblocked locking position of the translating cowl in the over-retracted position.

The actuator 281 of the locking device 280a further displaces the end of the tie rod 283a attached to the hook, outwardly according to the arrow E.

This displacement of the tie rod 283a, causes a rotation of the hook 280a in the first direction indicated by the arrow R, which allows displacing the roller 29a inwardly according to the arrow I. The translating cowl is then in the over-retracted position.

The term "over-retracted position" means that the translating cowl is closed beyond its normal rest position.

In this position, the tie rod 283a enables the rotation of the hook 280a towards the unlocking position (FIGS. 9 and 10).

The active locking system 28 is therefore in the unblocked locking position.

FIG. 14 represents the active locking system 28 in the blocked locking position of the translating cowl in the closed position.

The actuator 281 of the locking device 280a displaces the end of the tie rod 283a that is attached thereto, upstream.

Thus, the end of the tie rod 283a attached to the hook, is displaced inwardly, according to the arrow "I."

This displacement of the tie rod 283a, causes a rotation of the hook 280a in the direction opposite to the first direction, indicated by the arrow "R."

The translating cowl is then in the closed position.

The shackle 282a is also displaced following the movement of the hook 280a.

In this position, the tie rod 283a does not enable the rotation of the hook 280a towards the unlocking position (FIGS. 9 and 10).

The tie rod 283a is in the blocking position of the hook 280a.

The active locking system 28 is therefore in the blocked locking position.

Figure 15:
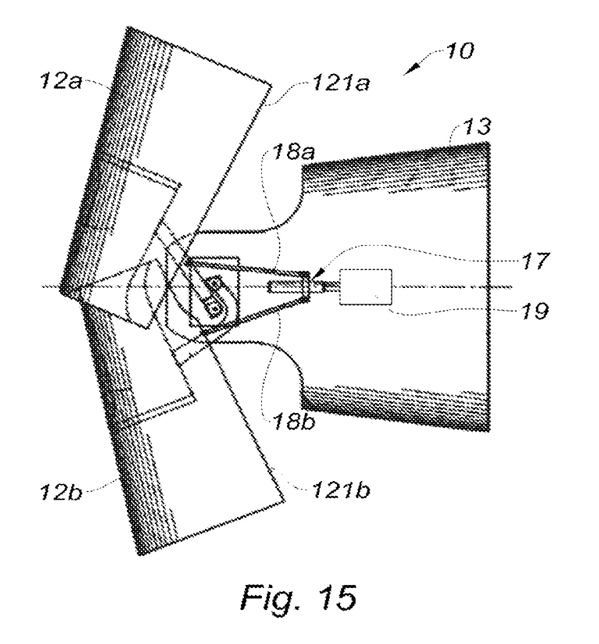
FIG. 15 is a schematic side view of the door thrust reverser of FIG. 8, viewed from the other side, showing a door closing system according to the present disclosure.

As illustrated in FIG. 15, the thrust reverser 10 of FIGS. 7 and 8 includes, in one form, a sliding element 17 disposed on the inner fixed structure 11 (FIG. 7) on the side opposite to the double-acting cylinder (FIG. 8).

The sliding element 17 is connected to each door 12a, 12b by the second respectively upper 18a and lower 18b connecting rods. Thus, the sliding element 17 is disposed on the inner fixed structure, at the level of the lateral edge 121a, 121b opposite to the first lateral edge 120a, 120b of the doors 12a, 12b.

The thrust reverser 10 further includes a device 19 for detecting a breakage of a connecting rod 16a, 16b, 18a, 18.

The second connecting rods 18a, 18b, are arranged to be driven by the doors 12a, 12b, when the double-acting cylinder 15 (FIG. 8) operates the doors 12a, 12b, towards the direct jet position (FIG. 7), by sliding within the sliding element 17.

The sliding element 17 includes two respectively upper and lower housings (not represented) within which the respectively upper 22a and lower 22b devices for displacing respectively the upper 282a and lower 282b blocking devices (FIGS. 1 to 6) slide. The housings are connected by a connecting device (not represented).

The displacement devices may also be called sliding members.

Respectively upper and lower springs (not represented) are disposed in the housings, upstream of the respectively upper 22a and lower 22b displacement devices (FIGS. 1 to 6).

The sliding element 17 forms an end-of-stroke stop upstream of each displacement device 22a, 22b.

As previously indicated, with regard to FIG. 7, each displacement device 22a, 22b carries a second connecting rod 18a, 18b. Thus, each second connecting rod 18a, 18b includes an end connected to a door 12a, 12b, and an opposite end connected to a displacement device 22a, 22b.

More specifically, the second connecting rods 18a, 18b are arranged to be driven by the doors 12a, 12b when the double-acting cylinder 15 (FIG. 8) operates the doors 12a, 12b towards the direct jet position, so as to displace the displacement devices 22a, 22b to which they are connected.

Each spring (not represented) is designed so as to be compressed by the displacement device 22a, 22b to which it is associated, when the second connecting rods 18a, 18b are driven by the doors 12a, 12b into the direct jet position. Furthermore, each spring allows exerting a force against the displacement device 22a, 22b to which it is associated, in the direction opposite to the displacement generated by the second connecting rods 18a, 18b, driven by the doors 12a, 12b into the direct jet position, and is designed so as to be compressed by the displacement device 22a, 22b to which it is associated, when the second connecting rods 18a, 18b are driven by the doors 12a, 12b into the direct jet position. Thus, in the direct jet position, the springs are compressed by the displacement devices 22a, 22b, and a clearance is present in each housing, downstream of each displacement device 22a, 22b.

The sliding element 17 is designed so as to slide by the action of a second connecting rod 18a or 18b when a spring is compressed in the closing direction, or when the clearance is consumed in the opening direction.

Consequently, a door whose first connecting rod is broken is closed or open when the sliding element slides.

The device 19 for detecting the breakage of a connecting rod 16a, 16b, 18a, 18b is associated to the shackles 282a, 282b (FIGS. 1 to 6), which act as sensors for detecting the breakage of a connecting rod.

The shackles 282a, 282b are unblocked (unblocking position of FIG. 2) when the connecting rods are functional.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An active locking system of a movable element for a thrust reverser of an aircraft nacelle, the thrust reverser including a fixed structure and at least one movable element, the at least one movable element being mounted pivoting or translating between a direct jet position, which provides aerodynamic continuity of the aircraft nacelle, and a reverse jet position which opens at least one passage in the aircraft nacelle, the active locking system comprising:
    an active locking device of the movable element, movable between a locking position and an unlocking position;
    an actuator of the active locking device controlled by a command for actuating the active locking device;
    a blocking device for blocking the active locking device in the unlocking position, the blocking device movable between a blocking position and an unblocking position; and
    a device for displacing the blocking device,
    wherein the command controls operation of the movable element towards the direct jet position, and the device for displacing the blocking device displaces the blocking device into the unblocking position when the movable element is at a predetermined position.

2. The active locking system according to claim 1, wherein the blocking device includes two hinged arms, a first arm of the two hinged arms being fixedly connected to the active locking device and a second arm of the two hinged arms being fixedly connected to the fixed structure.

3. The active locking system according to claim 1, wherein the device for displacing the blocking device is mechanically linked to the movable element.

4. The active locking system according to claim 1, wherein the device for displacing the blocking device is a sliding member connected to the movable element that slides during operation of the movable element towards the direct jet position and towards the blocking device so as to displace the blocking device into the unblocking position when the movable element is in the predetermined position.

5. The active locking system according to claim 1 further comprising a blocking spring that exerts a force against the blocking device in a direction opposite to displacement of the device for displacing the blocking device during operation of the movable element towards the direct jet position, the blocking spring being compressed by the blocking device during the displacement of the device for displacing the blocking device during operation of the movable element towards the direct jet position.

6. A system for closing a pair of doors for a thrust reverser of an aircraft nacelle, the pair of doors being diametrically opposed and pivotally mounted between a direct jet position, which provides aerodynamic continuity of the aircraft nacelle, and a reverse jet position which opens at least one passage in the aircraft nacelle, the system comprising:
    an actuator for closing the pair of doors including two first connecting rods, each first connecting rod being connected to a first lateral edge of each door of the pair of doors, the actuator being configured to operate each door of the pair of doors at least towards the direct jet position;
    two sliding members, each of the two sliding members carrying a second connecting rod connected to a second lateral edge opposite to the first lateral edge of each door of the pair of doors, the second connecting rod of each sliding member being configured to be driven by the pair of doors when the actuator operates the pair of doors towards the direct jet position, so as to displace the two sliding members; and
    an active locking system according to claim 1 for locking the pair of doors, wherein the device for displacing the blocking device comprises the two sliding members, wherein the at least one movable element comprises each of the pair of doors.

7. The system according to claim 6 further comprising a device for detecting a breakage of at least one of the first connecting rods or the second connecting rods.

8. A thrust reverser of an aircraft nacelle, the thrust reverser including at least one movable element mounted pivoting or translating between a direct jet position, which provides aerodynamic continuity of the aircraft nacelle, and a reverse jet position, which opens at least one passage in the aircraft nacelle, the thrust reverser comprising at least one active locking system according to claim 1.

9. The thrust reverser according to claim 8, wherein the at least one movable element is a translating cowl.

10. The thrust reverser according to claim 8, wherein the at least one movable element comprises a pair of diametrically opposed pivoting doors.

11. The thrust reverser according to claim 10 further comprising a system for closing the pivoting doors, the system comprising:
    an actuator for closing the pivoting doors including two first connecting rods, each first connecting rod being connected to a first lateral edge of each pivoting door, the actuator for closing the pivoting doors being configured to operate each pivoting door at least towards the direct jet position; and
    two sliding members, each of the two sliding members carrying a second connecting rod connected to a second lateral edge opposite to the first lateral edge of each pivoting door, the second connecting rod of each sliding member being configured to be driven by the pivoting doors when the actuator operates the pivoting doors towards the direct jet position, so as to displace the two sliding members, wherein the two sliding members form the device for displacing each blocking device.

12. The thrust reverser according to claim 11, wherein the system for closing the pivoting doors includes a device for detecting a breakage of at least one of the first connecting rods or the second connecting rods.

\* \* \* \* \*